United States Patent
Vijayrao et al.

(10) Patent No.: US 10,318,473 B2
(45) Date of Patent: Jun. 11, 2019

(54) INTER-DEVICE DATA-TRANSPORT VIA MEMORY CHANNELS

(71) Applicant: Facebook, Inc., Menlo Park, CA (US)

(72) Inventors: Narsing Vijayrao, Santa Clara, CA (US); Jason Taylor, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 724 days.

(21) Appl. No.: 14/035,833

(22) Filed: Sep. 24, 2013

(65) Prior Publication Data

US 2015/0089100 A1    Mar. 26, 2015

(51) Int. Cl.
*G06F 13/16* (2006.01)
*G06F 13/24* (2006.01)
*G06F 15/167* (2006.01)

(52) U.S. Cl.
CPC ............ *G06F 15/167* (2013.01); *G06F 13/16* (2013.01); *G06F 13/24* (2013.01)

(58) Field of Classification Search
CPC ......... G06F 13/24; G06F 13/16; G06F 15/167
USPC ....................................................... 710/260
See application file for complete search history.

(56) References Cited

U.S. PATENT DOCUMENTS

| | | | |
|---|---|---|---|
| 6,295,566 B1* | 9/2001 | Stufflebeam | G06F 13/4081 710/302 |
| 7,111,099 B2 | 9/2006 | Alexander et al. | |
| 8,032,688 B2 | 10/2011 | MacWilliams et al. | |
| 2002/0069301 A1 | 6/2002 | Fan et al. | |
| 2003/0177293 A1* | 9/2003 | Bilak | H04L 49/90 710/56 |
| 2006/0236009 A1* | 10/2006 | Tabira | G06F 13/385 710/110 |
| 2007/0002668 A1 | 1/2007 | Williams et al. | |
| 2007/0013704 A1 | 1/2007 | MacWilliams et al. | |
| 2007/0156991 A1 | 7/2007 | Gould et al. | |
| 2008/0016313 A1* | 1/2008 | Murotake | G06F 12/1416 711/173 |
| 2008/0082750 A1 | 4/2008 | Okin et al. | |
| 2008/0082751 A1 | 4/2008 | Okin et al. | |
| 2008/0082766 A1 | 4/2008 | Okin et al. | |
| 2009/0287748 A1* | 11/2009 | Wong | G06F 17/3028 |
| 2009/0292826 A1* | 11/2009 | Wong | G06F 3/0605 710/5 |
| 2009/0292838 A1* | 11/2009 | Wong | G11B 27/034 710/52 |

(Continued)

OTHER PUBLICATIONS

U.S. Appl. No. 14/614,145, of Vijayrao, N. et al. filed Feb. 4, 2015.

(Continued)

*Primary Examiner* — Tim T Vo
*Assistant Examiner* — Phong H Dang
(74) *Attorney, Agent, or Firm* — FisherBroyles, LLP (57) ABSTRACT

A method of operating a data transport system on a computing device is disclosed. The method comprises: writing outgoing data in a first memory space on a memory module of a computing device; detecting the outgoing data on the first memory space by a data channel component coupled to the memory module, wherein the first memory space is designated for external data transmission; and generating a transmission signal encoding the outgoing data, via the data channel component, for transmission from the memory module through an inter-device interconnect to an external memory module.

17 Claims, 8 Drawing Sheets

(56) References Cited

U.S. PATENT DOCUMENTS

| | | | |
|---|---|---|---|
| 2011/0320698 A1* | 12/2011 | Wang | G06F 13/1663 |
| | | | 711/105 |
| 2012/0079181 A1 | 3/2012 | Okin et al. | |
| 2014/0075106 A1 | 3/2014 | Okin et al. | |
| 2014/0129751 A1* | 5/2014 | Cho | G06F 13/24 |
| | | | 710/260 |
| 2014/0181435 A1* | 6/2014 | Privitt | G06F 11/2097 |
| | | | 711/162 |
| 2015/0074316 A1* | 3/2015 | Gaither | G06F 13/16 |
| | | | 710/308 |
| 2015/0261698 A1* | 9/2015 | Zhang | G06F 13/1621 |
| | | | 711/156 |
| 2016/0117098 A1 | 4/2016 | Vijayrao et al. | |

OTHER PUBLICATIONS

Notice of Allowance dated Aug. 29, 2016 of U.S. Appl. No. 14/614,145 by Vijayrao, N., et al., filed Feb. 4, 2015.

* cited by examiner

INTER-DEVICE DATA-TRANSPORT VIA MEMORY CHANNELS

TECHNICAL FIELD

The disclosed technology relates generally to inter-device communication.

BACKGROUND

Clusters of computing devices including interconnected computer nodes are sometimes employed to process high-volume data tasks. A computing cluster is a set of computing devices, e.g., configured as server racks comprising computing device "sleds" occupying one or more enclosures, or a computing network comprising multiple computing devices. Various data communications technologies have been deployed to enable the sleds to exchange data, e.g., Ethernet, Fiberchannel, etc. However, these technologies generally exchange data more slowly than processors are able to process data. The computing cluster has an advantage of surviving failures of individual computer, disk, network, or other subsystems. Increasing parallel processing and networking throughput can be useful to improve cluster performance. Different techniques to reduce interconnection overhead and latency have been tried on both software and hardware levels, but such techniques are limited by conventional system architectures of data pathways.

BRIEF DESCRIPTION OF THE DRAWINGS

The figures depict various embodiments of the disclosed technology for purposes of illustration only. One skilled in the art will readily recognize from the following discussion that alternative embodiments may be employed.

DETAILED DESCRIPTION

Overview of Technology

An inter-device data transport mechanism for a computing cluster is described ("the mechanism"). The mechanism employs a memory channel as a data transport path for exchanging data between computing devices and/or sleds. The memory channel may be implemented as data transport memory modules. In some embodiments, the data transport memory modules may be modified from a conventional memory module. In other embodiments, the data transport memory modules may be manufactured, built, and/or configured independently of a conventional memory module. In various embodiments, the data transport memory modules may emulate a conventional memory module.

The mechanism may include a first data transport memory module on a first machine, where the first data transport memory module includes a first connector. The first connector may be coupled via an inter-device interconnect to a second data processing machine, e.g., via a second connector of a second data transport memory module. The first and second connectors may each be coupled to a data channel component, e.g., a software implemented module, a hardware implemented module, an application specific integrated circuit (ASIC), field programmable gate array (FPGA), or any combination thereof, to enable networking and processing intelligence therewith. Various address spaces (e.g., virtual or physical) on the data transport memory modules may be designated as a send queue or a receive queue so that an application executing in the computing devices may read or write to the address spaces to exchange data. For example, the application can write to the send queue on the data transport memory module to send data or read from the read queue to receive data.

In various embodiments, the mechanism may enable disaggregation of computing device components or functionality by providing high bandwidth and low processing latency data transportation between computing devices through memory-channel communication. As an example, a processor can be associated with a first sled, a storage device with a second sled, and a memory device with a third thread. Because the memory channel data speed from a processor to a memory module is significantly higher than that of a PCI bus or a network cable (e.g., Ethernet or optical fiber), the disclosed technology enables data transport through the data transport memory modules at a higher speed and bandwidth than previously possible through the PCI buses or the network cables.

In various embodiments, the data transport memory modules are daughter cards that resemble the size and connection of conventional memory modules. The data transport memory modules may also employ (or emulate) the signaling and interface characteristics of conventional memory modules. However, the data transport memory modules are coupled to other data transport memory modules (e.g., at a different computing device), for example via a cable. The data transport memory modules may also have an on-board processor, e.g., to manage data communications and signaling.

Figure 1:
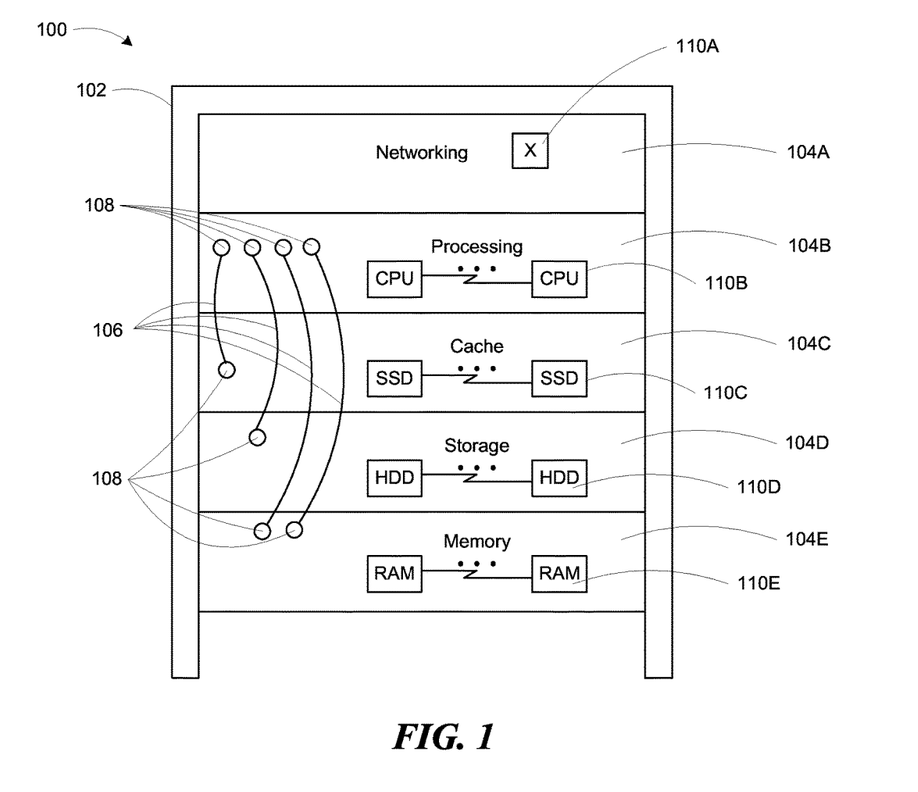
FIG. 1 is a block diagram illustrating an example of a cluster computing environment employing a memory channel for inter-device data transport, consistent with various embodiments.

FIG. 1 is a block diagram illustrating an example of a cluster computing environment 100 employing a memory channel for inter-device data transport, consistent with various embodiments. The computing environment 100 may sustain high bandwidth data sharing and processing. For example, the computing environment 100 may be a computing cluster, a server rack, or a server tray servicing a web application. As illustrated for example, the cluster computing environment 100 may include a disaggregated rack 102. The disaggregated rack 102 can be a computer cluster in which functional elements of the computer cluster are separated into separate devices, e.g., a networking (e.g., input/output (IO) processing) device 104A, a processing device 104B, a cache device 104C, a storage device 104D, and a memory service device 104E (collectively referred to as the "computing devices 104").

The computing devices 104 may be a computer, e.g., computer server, server sled, computer tray, desktop computer, or other types of computers. Each of the computing devices 104 may include a processor, a motherboard and a volatile memory.

In various embodiments, memory-centric inter-device interconnects 106 coupled to memory channel ports 108 may be a medium for inter-device data transportation in accordance with the disclosed technology. The memory channel ports 108 may enable computing devices 104 to exchange data via the inter-device interconnects 106. The inter-device interconnects 106 may be a bus or cable. The inter-device interconnects 106 may be multi-lane or single lane and may transmit or receive data via optics, electric signals, electro-magnetic signals, or other means of data communication. In some embodiments, each of the computing devices 104 may also include a network card, e.g., an optical or Ethernet NIC (not illustrated). The network card may be connected via a peripheral component interconnect (PCI) bus on the computing device's motherboard. Conventional inter-device architectures may utilize the network card as a portal for inter-device communication, where a cluster switch or router acts as a nexus for inter-device communications. As an example, a computing device may employ the network card to communicate with conventional computing devices not having a memory-centric inter-device interconnect 106 or memory channel port 108.

Disaggregation enables flexible allocation and/or re-allocation of system resources in the cluster computing environment 100 through customization of rack resources, and thus improving cluster scalability. For example, the networking device 104A may include one or more network components 110A (e.g., a switch or a network buffer); the processing device 104B may include one or more processor components 110B, the cache device 104C may include one or more cache memories 110C (e.g., solid state drives); the storage device 104D may include one or more persistent storage devices 110D (e.g., hard disks); and the memory service device 104E may include one or more random access memory modules 110E. The network components 110A, the processor components 110B, the cache memories 110C, the persistent storage devices 110D, and the random access memory modules 110E may be collectively referred to as "the resource components 110". Because the resource components 110 may serve the same client application, a same data set may necessarily be exchanged amongst multiple computing devices 104. Each of the resource components 110 can be independently serviced and/or upgraded, e.g., to suit the needs of applications the computing devices 104 may be configured to execute. As examples, a database application may receive faster storage devices 110D, a graphics processing application may receive processor components 110B designed to speed up graphics applications, and a web application may receive larger cache memories 110C.

In the context of a cluster computing environment 100, especially one including the disaggregated rack 102, a data path architecture should reduce network bottlenecks to enable parallel functions and services to operate seamlessly. A data path architecture including the memory-centric inter-device interconnects 106 and the memory channel ports 108 is advantageous for high-bandwidth data transportation because of removal of bottlenecks including, e.g., networking buffers, PCI cards, or other networking hardware (e.g., Ethernet cables).

By utilizing the memory channel ports 108, processors in each computing device 104 may utilize the existing memory module channels ("memory channel") as a medium of data communication that provides significant additional bandwidth as compared to conventional intra-subsystem data communications channels. For example, a 16 lane PCI data path may have around 40 Gbits/sec of bandwidth, whereas current dual in-line memory module (DIMM) technology may have approximately 10 GBytes/sec (i.e., approximately 80 Gbits/sec) of bandwidth from each memory module. Although computing device bus speeds have increased over time and continue to do so, so have memory module speeds. Currently, Double Data Rate 3 (DDR3) memory modules are employed and Double Data Rate 4 (DDR4), which is even faster, is on the horizon. To further increase the bandwidth through the memory channel, the memory channel ports 108 may be multiplexed from multiple memory channels. For example, whereas each memory module currently has 10 GBytes/sec of bandwidth, a multiplex of four memory channels may have approximately 40 GBytes/sec of bandwidth.

The memory channel data path architecture can be used by any computing device 104. As an example, the memory service device 104E may provide the random access memory modules 110E as a disaggregated pool of random access memory on a computing device separate from the processing device 104B. A memory controller on the memory service device 104E can expand and contract memory space for the processing device 104B, e.g., according to need on a dynamic or periodic basis. The memory-centric inter-device interconnects 106 can enable low-latency and high bandwidth communication between the disaggregated memory service device 104E and the disaggregated processing device 104B. As another example, regardless of whether there is disaggregation of cluster computing device functionalities, computing devices in the cluster computing environment 100 may utilize the memory channels to share data, e.g., large data sets, between processors (e.g., processors of the computing devices 104). Thus, the memory channel data path can enable much higher bandwidth and data communications speeds than conventional motherboard buses and/or interconnects.

Figure 2:
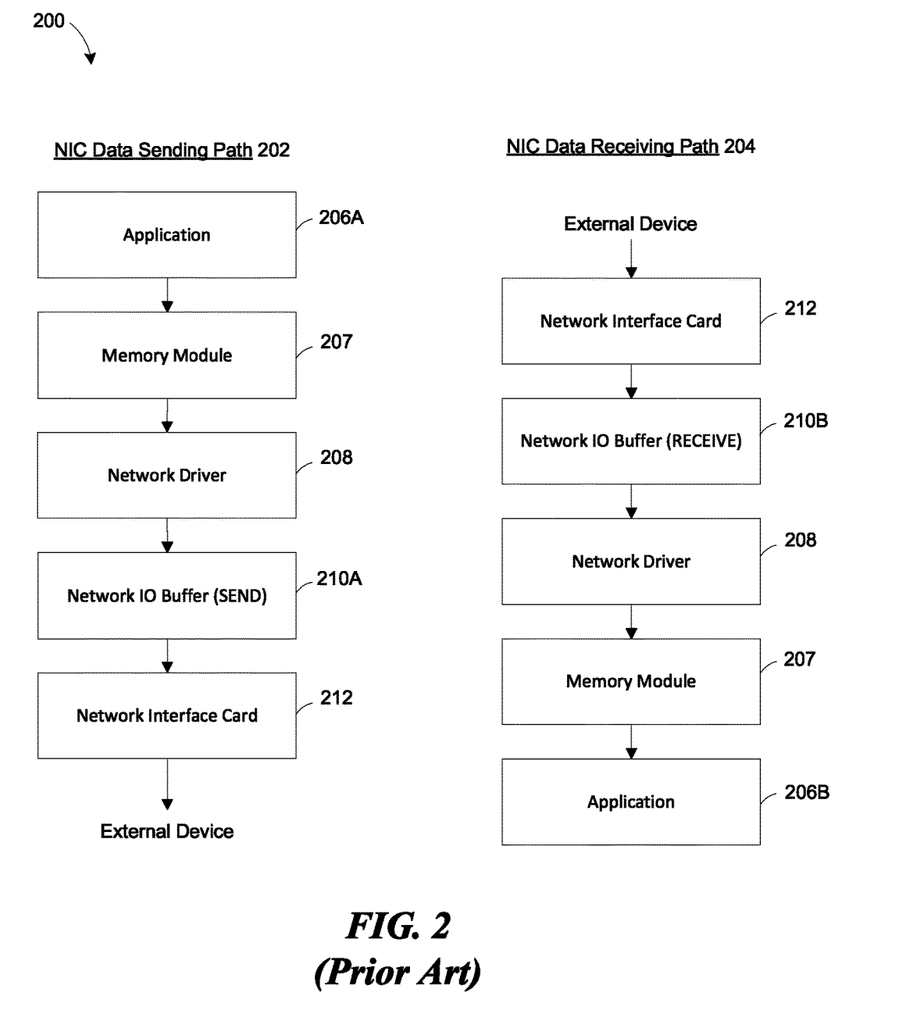
FIG. 2 is a data path diagram illustrating a conventional network interface card (NIC) data transport architecture.

FIG. 2 is a data path diagram illustrating a conventional NIC data transport architecture 200. The NIC data transport architecture 200 may include a data sending path 202 and a data receiving path 204. A computing device (e.g., one of the computing devices 104) can prepare data for transmission, sharing, or copying to an external device through an application 206A executed by a processor. The application 206A can then transfer the data via a memory module 207 through a network driver 208. For example, the application 206A can move the outgoing data set to a region of memory which is then transferred into a memory space for the network driver 208. In response, the network driver 208 may place the outgoing data set into a network IO buffer 210A for sending data. The network IO buffer 210A may reside in a memory space of a NIC 212 (e.g., a PCI-based network card). Once the outgoing data is in the network IO buffer 210A, the NIC 212 can transmit the outgoing data through a network connection, e.g., an optical fiber or an Ethernet cable.

In the data receiving path 204, the computing device can receive incoming data at the NIC 212 through the network connection. Once the NIC 212 receives the incoming data, the incoming data may be placed in a network IO buffer 210B for receiving. The network driver 208 can then direct the content of the network IO buffer 210B via a memory module 207 to an application 206B which implements a service for processing such data.

Figure 3:
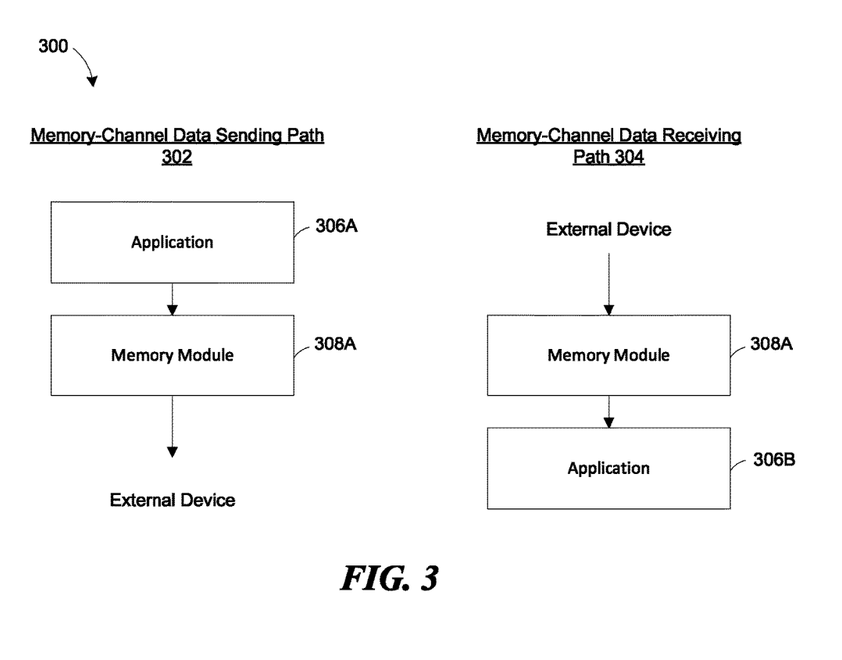
FIG. 3 is a data path diagram illustrating a memory channel data transport architecture, consistent with various embodiments.

FIG. 3 is a data path diagram illustrating a memory channel data transport architecture 300, consistent with various embodiments. The memory channel data transport architecture 300 may include a data sending path 302 and a data receiving path 304. A computing device (e.g., one of the computing devices 104) can prepare data for transmission, sharing, or copying to an external device through an application 306A executed by a processor. The application 306A can then transfer the data to a memory module 308A. For example, the application 306A may transfer the data to a memory-channel transport space designated for outgoing data. The memory-channel transport space may be a virtual address space, a physical address space, or a dynamically sized outgoing data queue. The memory module 308A of the memory channel data transport architecture can then send the outgoing data from the memory-channel transport space directly to an external computing device through an inter-device interconnect coupled to the memory module 308A.

In the data receiving path 304, the computing device can receive incoming data directly at a memory module 308B. The memory module 308B receives the incoming data by writing the incoming data into a memory-channel receiver space. Similar to the memory-channel transport space, the memory-channel receiver space may be a virtual address space, a physical address space, or a dynamically sized incoming data queue. The memory module 308A may be the same memory module as the memory module 308B or a different memory module.

Thus, the memory channel architecture completely bypasses conventional networking modules and relies only on memory channels for data communications. A comparison of FIG. 2 and FIG. 3 illustrates that the memory channel data transport architecture is advantageous at least because of the ability to avoid buffer over-load failure and to reduce data processing latency because communications over the data transport memory modules can occur at much higher speeds than conventional networking. When a high-speed and/or high-bandwidth application service executes at a computing device, the speed of interconnection may exceed the speed of data processing. For example, an input buffer may be used to prevent an input overflow during times in which the speed of data transferring exceeds the speed of data processing. When such situations occur for a short duration, the buffer is able to prevent an error/fault from occurring by processing some of the incoming data at a later time. When such situations occur for a long duration, the buffer is generally unable to help and a buffer overload occurs.

As shown, the NIC data transport architecture 200 is prone to such a buffer overload problem, whereas the memory-channel data transport architecture 300 is able to avoid the network buffer problem. The memory-channel data transport architecture 300 avoids a need for data processing before incoming data is placed in the operating memory of the processor by implementing the data transport directly from the memory modules. Moreover, a central processing unit (CPU) is relieved from additional processing relating to data communications.

Figure 4:
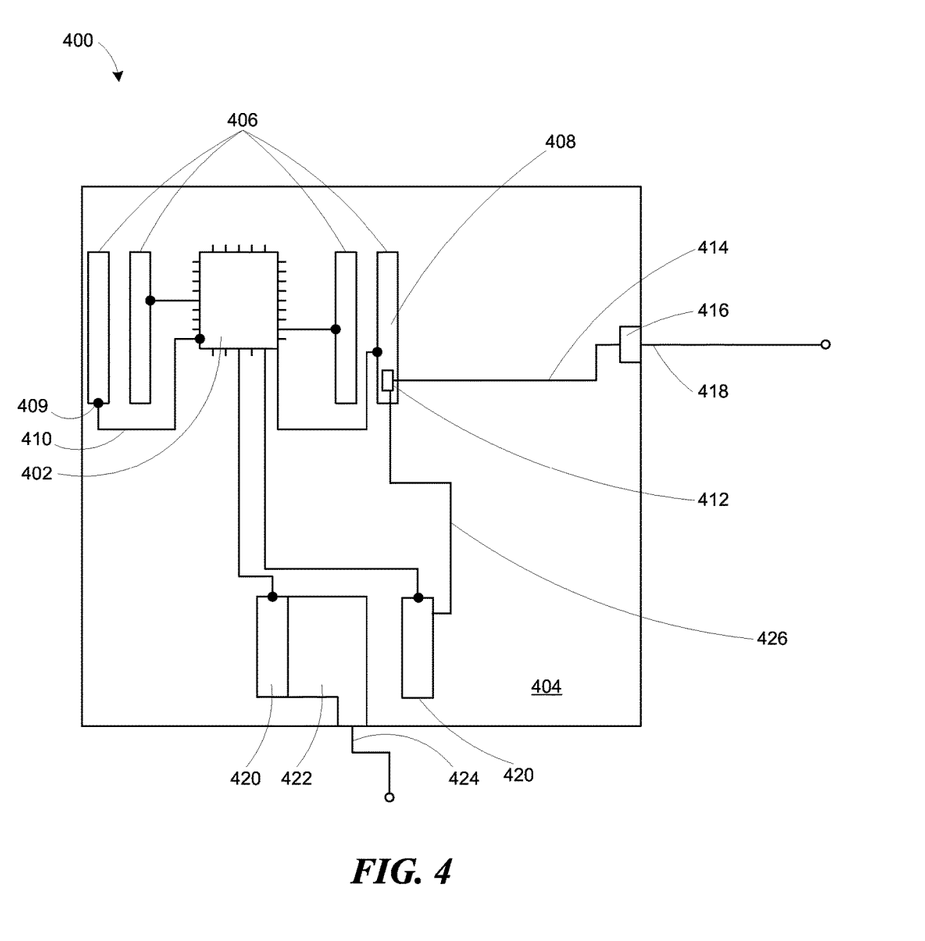
FIG. 4 is a block diagram illustrating a computing device implementing a memory-channel data transport architecture, consistent with various embodiments.

FIG. 4 is a block diagram illustrating a computing device 400 implementing a memory-channel data transport architecture (e.g., the memory-channel data transport architecture 300), consistent with various embodiments. The computing device 400 may be one of the computing devices 104 of FIG. 1. The computing device 400 includes a processor 402 on a chassis frame 404. The chassis frame 404 may comprise any rigid material including plastic, metal, alloy, carbon fiber, or any combination thereof. The chassis frame 404 may include a motherboard on which the processor 402 is coupled. The chassis frame 404 provides structure supporting the components and modules of the computing device 400. For example, the chassis frame 404 may be a computer sled mountable on a computer rack, e.g., in an enclosure (not illustrated).

The processor 402 is coupled to one or more memory modules 406, e.g., via a bus or other interconnect. The memory modules 406, for example, may be dual inline memory modules (DIMM). The memory modules 406 may be synchronous dynamic random-access memory (SDRAM), including double data rate (DDR) SDRAM. The memory modules 406 may include one or more data transport memory modules, e.g., data transport memory modules 408. For example, the data transport memory modules 408 may be the memory module 308A or the memory module 308B of FIG. 3. The memory modules 406 may include a memory channel interface 409, e.g., to couple the memory modules 406 to the processor 402 through a memory channel 410. For example, the memory channel interface 409 may comprise DIMM sockets coupled to the motherboard and DIMM pins of the memory modules 406.

In various embodiments, the processor 402 may act as a memory controller. In other embodiments, a separate component on the motherboard and/or a memory module may be implemented as the memory controller. The memory channel 410 enables the memory controller (e.g., the processor 402) to send commands to the memory modules 406 to write or access specific memory address spaces of the memory modules 406. Multiple memory modules 406 may be connected to an instance of the memory channel 410. Multiple memory channels 410 may be utilized for inter-device communication through the data transport memory modules 406.

Each data transport memory modules 408 may be modified from a conventional memory module to be coupled to a data channel component 412. The data channel component 412 may reside completely on or partially on the data transport memory modules 408. The data channel component 412 may be implemented as software, hardware, or a combination thereof. The data channel component 412 may be an ASIC, a FPGA, or other integrated circuit component. In some embodiments, features of the data channel component 412 may further be partially or completely implemented by the processor 402.

In various embodiments, the data transport memory modules 408 may emulate, perfectly or substantially, the conventional memory modules when interacting with the processor 402 and the motherboard. The data channel component 412 of the data transport memory modules 408 may transfer the outgoing data placed on the data transport memory modules 408 (e.g., where the data transport memory modules 408 implements a memory space layout as illustrated in FIG. 5) to a computing device external to the computing device 400.

In some embodiments, computing devices may be interconnected via a memory-channel transport path. For example, the data channel component 412 may be adapted to couple with an internal interconnect 414. The internal interconnect 414 may be a bus, a wire, a cable, other physical medium for data transportation, or any combination thereof. The internal interconnect 414 is adapted to couple with a memory channel port 416 (e.g., the memory channel port 108). In various embodiments, the internal interconnect 414 may be detachably connectable to the data channel component 412 and the memory channel port 416. The memory channel port 416 may be exposed from an edge of the chassis frame 404. The memory channel port 416 enables an inter-device interconnect 418 (e.g., the inter-device interconnect 106) to establish a data path from the data transport memory modules 408 of the computing device 400 to an external computing device (e.g., instances of the data transport memory modules 408 of the external computing device). In various embodiments, the data transport memory module 408 through the data channel component 412 may be adapted to couple with multiple inter-device interconnects 418.

The memory channel port 416 may be coupled to more than one of the internal interconnects 414. For example, the memory channel port 416 may include a multiplexer for multiplexing the internal interconnects 414 from multiple instances of the data channel components 412 from multiple data transport memory modules 408. The inter-device interconnect 418 may be a multi-lane bus, an optical based channel, or any other medium for transmitting digital information. In various embodiments, the inter-device interconnect 418 may have more bandwidth than each of the memory channel 410.

Figure 5:
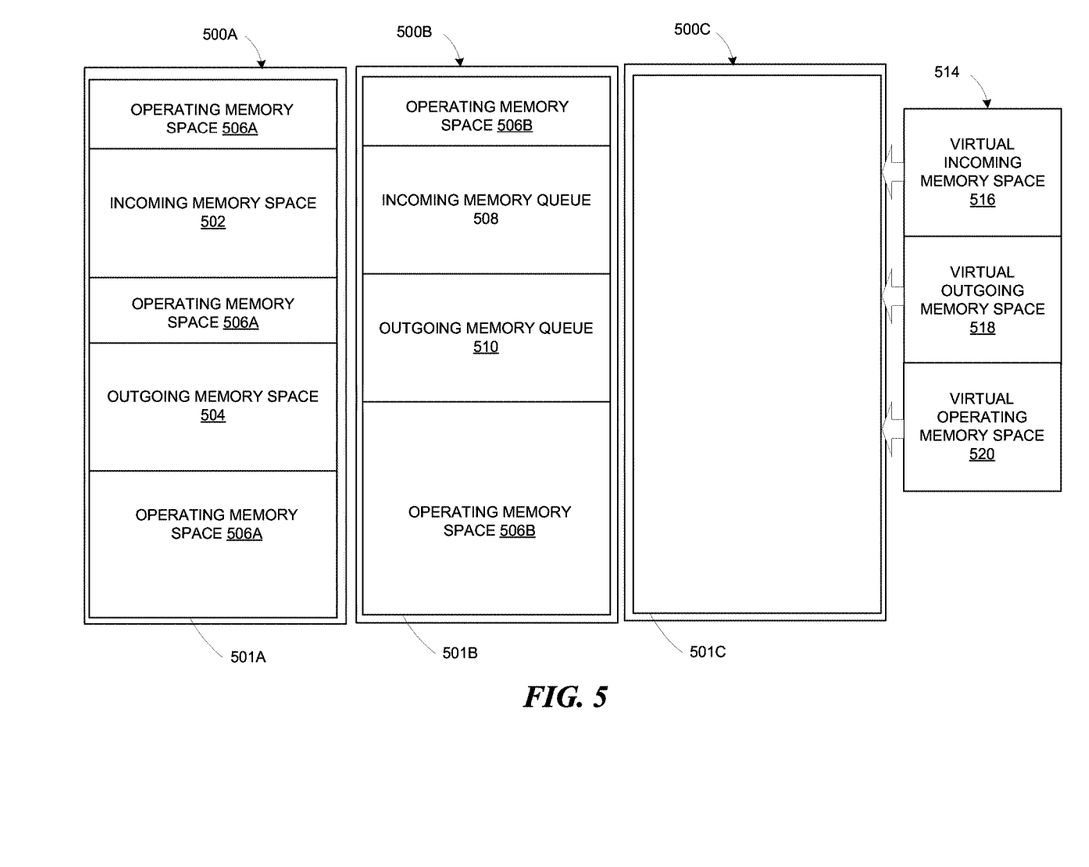
FIG. 5 is a block diagram illustrating examples of memory space layouts of data transport memory modules, consistent with various embodiments

The data transport memory modules 408 may follow one or more layout patterns as illustrated in FIG. 5. The data channel component 412 is adapted to detect when to transmit data from an outgoing memory space of the data transport memory modules 408 and transmit data in the outgoing memory space through the internal interconnect 414 and the memory channel port 416 and over the inter-device interconnect 418. The data channel component 412 is also adapted to detect when incoming data arrives via the inter-device interconnect 418, and store the incoming data in the incoming memory space (e.g., the different incoming memory space as illustrated in the different layout patterns of FIG. 5 and described in further detail below). The data channel component 412 may be adapted to communicate with a memory controller (e.g., the processor 402) in a manner similar to that of conventional memory modules.

The computing device 400 may also include one or more PCIs 420. The PCIs 420 provide a data signal path for components and modules of the computing device 400 to communicate with the processor 402. The PCIs 420 are configured based on a high-speed serial computer expansion bus standard and may include the PCI express (PCIe) standard. For example, a NIC 422 may be connected to one of the PCIs 420. A communication link 424, e.g., Ethernet or an optical link, may be coupled to the NIC 422. In the example, the NIC 422 may receive outgoing data from the processor 402 and process data transportation through the communication link 424. As an example, the NIC 422 may receive incoming data from the communication link 424 and transport such data to the processor 402 through the PCI signal path.

In some embodiments, the data channel component 412 may include an asynchronous interrupt signal path. For example, while a conventional memory interconnect does not support asynchronous interrupt (i.e., where a signal to the processor 402 emitted by hardware or software indicating an event that needs immediate attention from the processor), the PCIs 420 (e.g., PCIe) may support asynchronous interrupt signals. Thus, the data channel component 412 may couple to one of the PCIs 420 via a PCI connection 426. In various embodiments, the data channel component 412 may use the PCI connection 426 to signal the processor 402, e.g., to issue an interrupt when incoming data is detected to have been written to the incoming data memory space of the data transport memory module 408. Because power fed into the memory modules 406 in general may be less than that of the PCIs 420, in various embodiments, the data channel component 412 may also draw power from the PCI connection 426.

FIG. 5 is a block diagram illustrating examples of memory space layouts of data transport memory modules, consistent with various embodiments. A data transport memory module 500A implements an example of a physical partition layout on a memory component 501A of the data transport memory module 500A. The memory component 501A, for example, may be one or more random access memory integrated circuits. The memory component 501A is adapted to store digital data for one or more processors (e.g., the processor 402). The physical address space of the data transport memory module 500A may be partitioned into an incoming memory space 502, an outgoing memory space 504, and an operating memory space 506A.

The incoming memory space 502 and the outgoing memory space 504 may be statically or dynamically configurable. The incoming memory space 502 and the outgoing memory space 504 may be allocated such that an application running on a computing device having the data transport memory module 500A may initiate or receive inter-device communication by writing to the allocated incoming or outgoing data memory spaces. The operating memory space 506A can be identical to an ordinary memory module. For example, the operating memory space 506A may be randomly accessed by applications of a computing device.

In various embodiments, the outgoing memory space 504 may be designated as the memory space for communicating outgoing data to a specific destination location, e.g., a particular processor or a particular external memory module. The incoming memory space 504 may be designated as the memory space for receiving incoming data from a specific data source location, e.g., a particular processor or a particular external memory module. Hence, an application may transmit data and receive data without encoding source and/or destination information on the data streams.

A data transport memory module 500B implements an example of an I/O queues layout on a memory component 501B of the data transport memory module 500B. The memory component 501B, for example, may be one or more random access memory integrated circuits. The memory component 501B is adapted to store digital data for one or more processors (e.g., the processor 402) similar to the memory component 501A. The memory address space of the data transport memory module 500B may include an incoming memory queue 508 and an outgoing memory queue 510. The data transport memory module 500B is configured with the incoming memory queue 508 and the outgoing memory queue 510 allocated such that an application running on a computing device having the data transport memory module 500B may initiate or receive inter-device communication by writing to the allocated I/O memory queues. The incoming memory queue 508 and the outgoing memory queue 510 may be dynamically allocated, such that when a particular I/O traffic is high, the memory queue for that I/O traffic is expanded into the other memory spaces. The rest of the memory address space may be allocated for operating memory space 506B, similar to the operating memory space 506A. The incoming memory queue 508, the outgoing memory queue 510, and the operating memory space 506B may be dynamically allocated on a physical memory address space or a virtual memory address space of the data transport memory module 500B.

In various embodiments, the incoming data stream may encode the data source identifier for each segment of the incoming data and the outgoing data stream may encode the destination identifier for each segment of the outgoing data. A data channel component of the data transport memory module 500B may read the encoded destination identifier to determine through which particular inter-device interconnect (e.g., the memory-centric inter-device interconnect 106) to transmit the outgoing data segment.

A data transport memory module 500C implements an example of a virtual I/O memory space layout on a memory component 501C of the data transport memory module 500C. The memory component 501C, for example, may be one or more random access memory integrated circuits. The memory component 501C can be adapted to store digital data for one or more processors (e.g., the processor 402) similar to the memory components 501A or 501B. The data transport memory module 500C can be configured with a virtual to physical map 514. The virtual to physical map 514 can include a mapping of virtual memory address space available to the processor (e.g., the processor 402) to the physical memory address space on the memory component 501C. The virtual to physical map 514 may be stored on a data channel component (e.g., the data channel component 412), a specific physical address space of the data transport memory module 500C, a memory controller of a computing device having the data transport memory module 500C, another memory module of the computing device, or any other part of the computing device.

The virtual to physical map 514 may include a virtual incoming memory space 516 and a virtual outgoing memory space 518. The virtual incoming memory space 516 and the virtual outgoing memory space 518 may be allocated such that an application running on the computing device may initiate or receive inter-device communication by writing to the allocated I/O virtual memory spaces. The virtual incoming memory space 516 and the virtual outgoing memory space 518 may be static or dynamically configurable. In various embodiments, a memory controller (e.g., the processor 402) or other system service may be able to reconfigure the virtual incoming memory space 516 and the virtual outgoing memory space 518. The rest of the virtual memory space may be allocated for a virtual operating memory space 506C, similar to the operating memory space 506B.

In various embodiments, the virtual outgoing memory space 518 may be designated as the memory space for communicating outgoing data to a specific destination location, e.g., a particular processor or a particular external memory module. The virtual incoming memory space 516 may be designated as the memory space for receiving incoming data from a specific data source location, e.g., a particular processor or a particular external memory module. Hence, an application may transmit data and receive data without encoding source and/or destination information on the data streams.

In some memory management architectures, a memory controller may control the virtual to physical map 514 to apply channel balancing (e.g., redistributing memory allocation based on workload of each memory module). Under these memory management architectures, the memory controller may be configured to synchronize with the data channel component of the data transport memory module 500C regarding the mapping of the virtual and physical I/O memory spaces such that the data channel component can select the right data to transmit out to external memory modules.

Various embodiments may be implemented with the data transport memory module 500A, the data transport memory module 500B, the data transport memory module 500C, or any combination thereof. In some embodiments, the data channel component (e.g., the data channel component 412) of the data transport memory modules 500A/500B/500C may enable reconfiguration of the data transport memory modules between the different memory space layouts presented in FIG. 5. In some embodiments, the operating memory space 506A/506B/506C may be utilized by the data channel component to perform data communication processing, including buffering, handshaking, or other signal processing.

Figure 6:
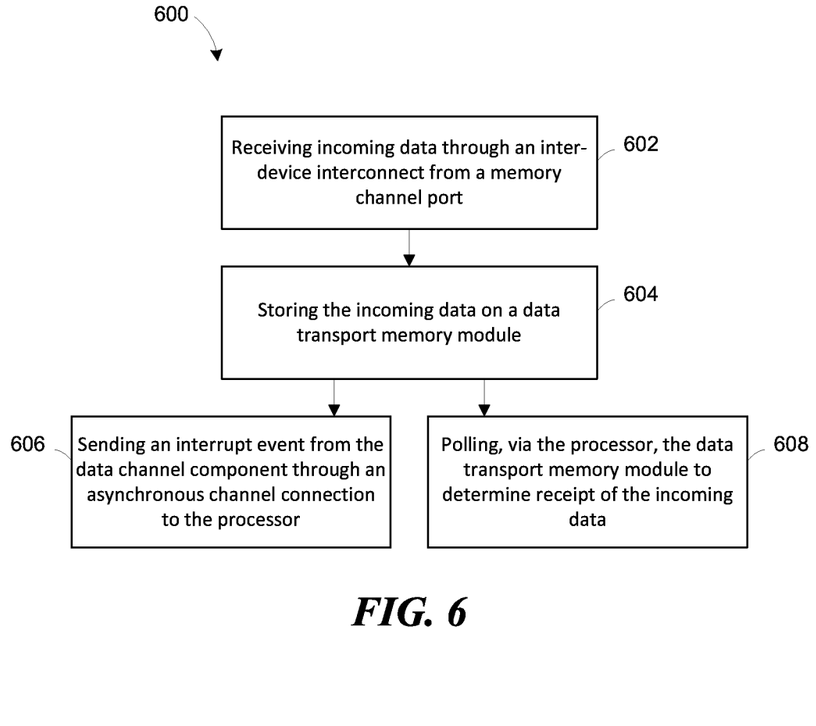
FIG. 6 is a flow diagram illustrating a method of receiving incoming data through a memory channel, consistent with various embodiments.

FIG. 6 is a flow diagram illustrating a method 600 of receiving incoming data through a memory channel, consistent with various embodiments. The method 600 includes receiving incoming data through an inter-device interconnect from a memory channel port at block 602. In response to receiving the incoming data, a data channel component (e.g., the data channel component 412) can store the incoming data on a data transport memory module (e.g., the data transport memory module 408) at block 604. The method 600 may include different ways of notifying a processor (e.g., the processor 402), executing an application service, the receipt of the incoming data.

As an example, the method 600 may at block 606 send an interrupt event from the data channel component through an asynchronous channel connection (e.g., the PCI connection 426 or other software or hardware interrupt channels) to the processor to notify the processor of the receipt of the incoming data. Alternatively, the method 600 may at block 608 poll, via the processor, the data transport memory module to determine receipt of the incoming data. As would be known to one having ordinary skill in the art, polling and interrupting each have advantages and disadvantages. In some embodiments, the data transport memory module may monitor for completion of the data transfer before notifying the processor (e.g., sending the interrupt event or raising a data transfer completed flag monitored by the polling of the processor).

Those skilled in the art will appreciate that the logic illustrated in FIG. 6 and described above, and in each of the flow diagrams discussed below, may be altered in a variety of ways. For example, the order of the logic may be rearranged, substeps may be performed in parallel, illustrated logic may be omitted, other logic may be included, etc.

Figure 7:
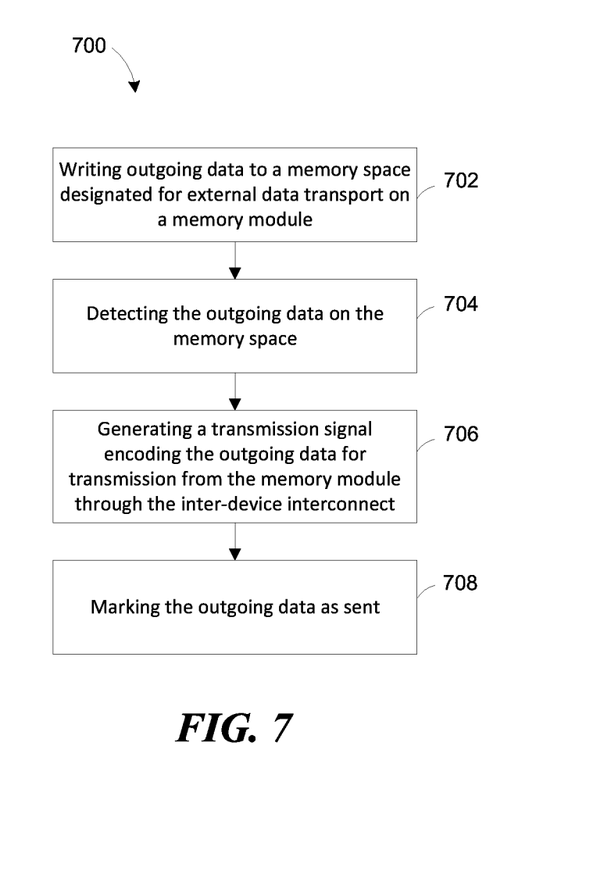
FIG. 7 is a flow diagram illustrating a method of transmitting outgoing data through a memory channel, consistent with various embodiments.

FIG. 7 is a flow diagram illustrating a method 700 of transmitting outgoing data through a memory channel, consistent with various embodiments. The method 700 includes writing outgoing data to a memory space designated for external data transport on a memory module (e.g., the data transport memory module 408) at block 702. A data channel component (e.g., the data channel component 412) coupled to the memory module can then detect the outgoing data on the memory space at block 704. At block 706, the data channel component can then generate a transmission signal encoding the outgoing data for transmission from the memory module through an inter-device interconnect (e.g., the inter-device interconnect 106 or the inter-device interconnect 418) to an external memory module. In response, the outgoing data can be marked as sent by the data channel component at block 708.

Those skilled in the art will appreciate that the logic illustrated in FIG. 7 and described above may be altered in various ways. For example, the order of the logic may be rearranged, substeps may be performed in parallel, illustrated logic may be omitted, other logic may be included, etc.

Figure 8:
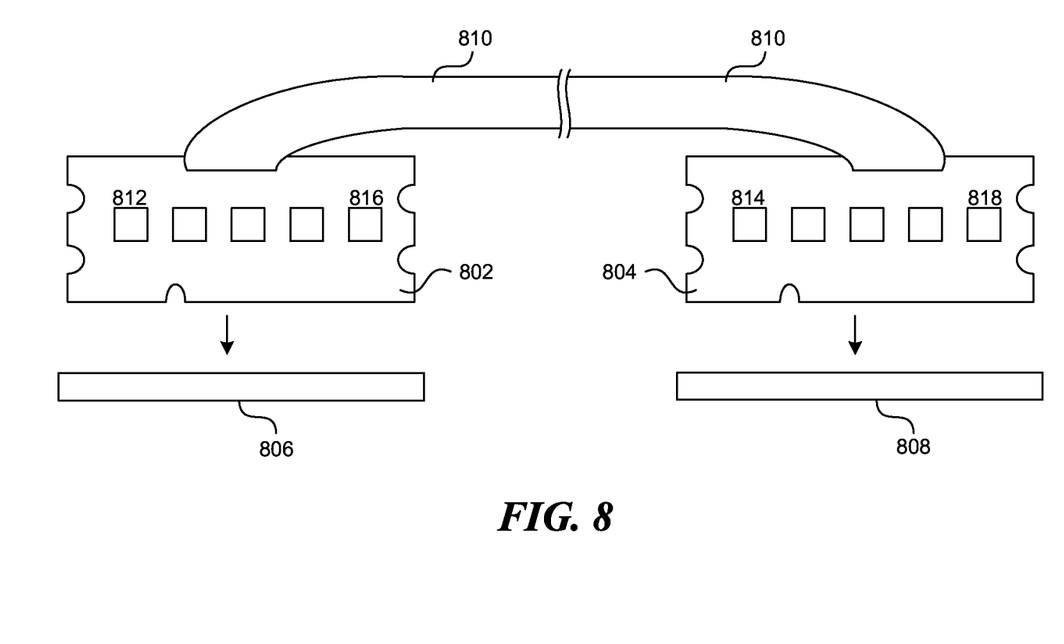
FIG. 8 is a block diagram illustrating data transport memory modules in communication with one another via a memory channel, consistent with various embodiments.

FIG. 8 is a block diagram illustrating data transport memory modules (e.g., the memory channel memory modules 408) in communication with one another via a memory channel, consistent with various embodiments. As illustrated, a first data transport memory module 802 and a second data transport memory module 804 may each be a memory module coupled to a computing device. For example, the first data transport memory module 802 may be coupled to a first memory slot 806 on a motherboard of a first computing device (not shown) and the second data transport memory module 804 may be coupled to a second memory slot 808 on a motherboard of a second computing device (not shown).

The first data transport memory module 802 and the second data transport memory module 804 are coupled to one another via an inter-device interconnect 810, e.g., the inter-device interconnect 106 or the inter-device interconnect 418. For example, data may be transported from a first memory chip 812 on the first data transport memory module 802 to a second memory chip 814 on the second data transport memory module 804.

The first data transport memory module 802 and the second data transport memory module 804 may service their respective computing devices as conventional memory modules, storing and retrieving data from memory chips for a processor on the respective computing devices. For example, the first data transport memory module 802 may include a plurality of memory chips including the first memory chip 812, and the second data transport memory module 804 may include a plurality of memory chips including the second memory chip 814.

To facilitate and manage the data transfers, the first data transport memory module 802 may include a data channel component 816 (e.g., the data channel component 412). Similarly, the second data transport memory module 804 may include a data channel component 818 (e.g., the data channel component 412). For example, the first data channel component 816 may initiate a transfer over the inter-device interconnect 810 when data arrives in a transmit queue (e.g., the outgoing memory space 504, the outgoing memory queue 510, or the virtual outgoing memory space 518) on the first memory chip 812. As an example, the second data channel component 818 may then alert a processor on the second computing device when data is written into a receive queue (e.g., the incoming memory space 502, the incoming memory queue 508, or the virtual incoming memory space 516) on the second memory chip 814 from the inter-device interconnect 810.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on the communications link. Various communications links may be used, such as the Internet, a local area network, a wide area network, or a point-to-point dial-up connection. Thus, the computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the disclosed technology is not limited except as by the appended claims.

What is claimed is:

1. A method, comprising:
    designating, by a processor of a computing device for a first cluster resource component in a cluster computing system, a first memory queue on a memory module of the computing device for communicating outgoing data to a second cluster resource component in the cluster computing system, wherein:
        the first cluster resource component performs, at the computing device, a first function in the cluster computing system;
        the second cluster resource component performs, at an additional computing device, a second function in the cluster computing system;
        the first function and the second function are different functions;
        the first memory queue is one of a plurality of memory queues on the memory module designated for external data transmission; and
        the first memory queue is designated for external data transmission to a specified external memory module of the additional computing device;
    designating, by the processor of the computing device for the first cluster resource component, a second memory queue on the memory module of the computing device for receiving incoming data from the specified external memory module, wherein the second memory queue is designated for externally received data, the first memory queue and the second memory queue being different memory queues;
    receiving, by the processor of the computing device for the first cluster resource component, the outgoing data to be written to the first memory queue;
    storing, by the processor of the computing device via a memory channel interface in response to the request, the outgoing data in the first memory queue;
    detecting, by a data channel component of the computing device coupled to the memory module, the outgoing data in the first memory queue;
    generating, by the data channel component in response to detecting the outgoing data in the first memory queue, a transmission signal encoding the outgoing data for transmission from the memory module through an inter-device interconnect between the computing device and the additional computing device to the specified external memory module of the additional computing device without transmission through the memory channel interface connecting the memory module and the processor, wherein the inter-device interconnect is a memory-centric interconnect configured to transfer data between memory modules, including the specified external memory module of the additional computing device and the memory module of the computing device;

receiving, via the data channel component rather than via the memory channel interface, incoming data at the memory module of the computing device from the specified external memory module of the additional computing device; and storing, by the data channel component, the incoming data in the second memory queue on the memory module.

2. The method of claim 1, further comprising sending, in response to receiving the incoming data at the memory module, a data receipt interrupt event from the memory module through an asynchronous channel connection to the processor of the computing device.

3. The method of claim 1, further comprising polling, via the processor of the computing device, the memory module to determine receipt of the incoming data in the second memory queue.

4. The method of claim 1, further comprising determining, in response to receiving the incoming data at the memory module, a data source of the incoming data from the inter-device interconnect; wherein storing the incoming data includes selecting the second memory queue associated with the data source.

5. A memory module, comprising:
a memory channel interface at a first computing device for communicating with a processor of the first computing device, the first computing device comprising a first cluster resource component in a cluster computing system;
a memory component at the first computing device configured to provide random-access memory space to the processor, wherein:
the random-access memory space is partitioned with a plurality of memory queues designated for storing outgoing data;
the memory component is further configured to enable the processor to designate, from the plurality of memory queues, a first memory queue for the first cluster resource component for communicating outgoing data to a second cluster resource component in the cluster computing system;
the first cluster resource component performs, at the first computing device, a first function in the cluster computing system;
the second cluster resource component performs, at a second computing device, a second function in the cluster computing system;
the first function and the second function are different functions;
the first memory queue is designated for storing outgoing data from the processor to a specified external memory module of the second computing device;
the random-access memory space is further partitioned with an additional plurality of memory queues designated for storing incoming data;
the memory component is further configured to enable the processor to designate, from the additional plurality of memory queues, a second memory queue for the first cluster resource component for receiving incoming data from the second cluster resource component; and
the first memory queue and the second memory queue are different memory queues; and
a data channel component at the first computing device configured to couple with multiple inter-device interconnects through an internal interconnect separate from the memory channel interface;
wherein the data channel component is configured to manage data communication through a specified inter-device interconnect configured to transfer data only between memory modules including the specified external memory module of the second computing device and the memory module of the first computing device based on data in the first memory queue and the second memory queue.

6. The memory module of claim 5, wherein the first memory queue is dynamically allocated depending on traffic through the data channel component.

7. The memory module of claim 5, wherein:
the memory component is further configured to enable the processor to designate, from the plurality of memory queues, a third memory queue for the first cluster resource component for communicating outgoing data to a third cluster resource component in the cluster computing system; and
the memory component is further configured to enable the processor to designate, from the additional plurality of memory queues, a fourth memory queue for the first cluster resource component for receiving incoming data from the third cluster resource component;
the third cluster resource component performs, at a third computing device, a third function in the cluster computing system;
the first function, the second function, and the third function are different functions.

8. The memory module of claim 5, wherein the data channel component is further configured to couple with a peripheral component interconnect (PCI) at the first computing device, wherein the data channel component is configured to send out a data receipt interrupt signal through the PCI in response to receipt of the incoming data to the second memory queue.

9. The memory module of claim 5, wherein the data channel component is further configured to couple with a peripheral component interconnect (PCI), wherein the data channel component is configured to draw power from the PCI.

10. The memory module of claim 5, wherein the random-access memory space is exposed to the processor as a virtual memory address space defined by a virtual-to-physical memory address map, the random-access memory space including a virtual outgoing memory queue allocated to store outgoing data and a virtual incoming memory queue allocated to store incoming data.

11. A computing device in a cluster computing system, comprising:
a processor;
a first memory channel coupled to the processor;
a first memory module, coupled to the processor via the first memory channel, wherein:
the first memory module is configured to enable the processor to designate, for a first cluster resource component of the computing device, a first memory queue for communicating outgoing data to a second memory module of a second cluster resource component in the cluster computing system;
the first cluster resource component performs, at the computing device, a first function in the cluster computing system;
the second cluster resource component performs, at an additional computing device, a second function in the cluster computing system;
the first function and the second function are different functions;

the first memory module is further configured to enable the processor to designate, for the first cluster resource component, a second memory queue for receiving incoming data from the second memory module of the second cluster resource component;

the first memory module includes a data channel component adapted to engage in inter-device communication of data in the first memory queue and the second memory queue;

the first memory queue and second memory queue are each one of a plurality of memory queues of the first memory module;

the first memory queue is designated for inter-device communication to a specified external memory module of a plurality of memory modules; and the first memory queue and the second memory queue are different memory queues; and an inter-device communication port, coupled to the data channel component independent of the first memory channel and adapted to detachably connect with multiple inter-device interconnects configured to provide data transport between the plurality of memory modules, wherein the first memory module is configured to receive data, prior to processing the data by the processor, from the inter-device communication port.

12. The computing device of claim 11, wherein the inter-device communication port multiplexes internal interconnects connected to multiple memory modules, wherein the multiple memory modules are coupled to the processor via multiple memory channels.

13. The computing device of claim 11, further comprising an asynchronous interrupt channel connecting the first memory module and the processor, wherein the first memory module is adapted to send an interrupt signal through the asynchronous interrupt channel when inter-device data is received at the first memory module.

14. The computing device of claim 11, wherein the processor is a memory controller adapted to dynamically allocate the first memory module to an external processor of the additional computing device; wherein the first memory module communicates with the external processor through the inter-device interconnect.

15. The method of claim 1, further comprising designating, by the processor of the computing device for the first cluster resource component, a memory space on the memory module of the computing device for operating memory, wherein the memory space is not used to communicate outgoing data or receive incoming data.

16. The method of claim 1, wherein:

the cluster computing system comprises a disaggregated rack having, on separate computing devices, a processing component, a caching component, a storage component, and a memory component each servicing a web application;

the first cluster resource component is the processing component; and the second cluster resource component is one of the caching component, the storage component, or the memory component.

17. The method of claim 1, wherein:

the first cluster resource component is a processing component servicing a database application; and the second cluster resource component is a storage component servicing the database application.

* * * * *